United States Patent

Kian et al.

[11] Patent Number: 5,925,432
[45] Date of Patent: *Jul. 20, 1999

[54] PRIMERLESS PRESSURE-SENSITIVE ADHESIVE CONSTRUCTIONS

[75] Inventors: Kamram Kian, Luxembourg, Luxembourg; Henk de Koning, Zevenhuizen, Netherlands; Yukihiko Sasaki, Claremont; Luigi Sartor, Pasadena, both of Calif.

[73] Assignee: Avery Dennison Corporation, Pasadena, Calif.

[ * ] Notice: This patent is subject to a terminal disclaimer.

[21] Appl. No.: 08/616,858

[22] Filed: Mar. 15, 1996

Related U.S. Application Data

[63] Continuation of application No. 08/528,082, Sep. 14, 1995, which is a continuation-in-part of application No. 08/307,944, Sep. 16, 1994, Pat. No. 5,558,913.

[51] Int. Cl.⁶ .................................................. B32B 7/10
[52] U.S. Cl. ........................ 428/40.1; 283/81; 428/41.7; 428/41.8; 428/41.9; 428/42.2; 428/42.3; 428/214; 428/354
[58] Field of Search ................. 428/40.1, 41.7, 428/41.8, 41.9, 42.2, 42.3, 354, 214; 283/81

[56] References Cited

U.S. PATENT DOCUMENTS

| | | | |
|---|---|---|---|
| 3,464,842 | 9/1969 | Jackstadt | 428/40.1 |
| 4,992,501 | 2/1991 | Hanninen et al. | 524/272 |
| 5,196,504 | 3/1993 | Scholz et al. | 526/318.4 |
| 5,326,644 | 7/1994 | Scholz et al. | 428/514 |
| 5,380,779 | 1/1995 | D'Haese | 524/272 |
| 5,558,913 | 9/1996 | Sasaki | 428/41.8 |

FOREIGN PATENT DOCUMENTS

| | | |
|---|---|---|
| 6-1958 | 1/1994 | Japan . |
| 7-3218 | 1/1995 | Japan . |
| WO 93/08239 | 4/1993 | WIPO . |
| WO 94/03550 | 2/1994 | WIPO . |
| WO 95/14746 | 6/1995 | WIPO . |
| WO 96/08230 | 3/1996 | WIPO . |

*Primary Examiner*—Nasser Ahmad
*Attorney, Agent, or Firm*—Knobbe, Martens, Olson & Bear, LLP

[57] ABSTRACT

Disclosed herein is a primerless removable pressure sensitive adhesive construction comprising an unprimed facestock, a first adhesive layer in contact with the facestock, a second removable pressure sensitive adhesive layer in contact with the first adhesive layer, and a release surface in contact with the second adhesive layer. Advantageously, constructions of this design exhibit improved layflatness in comparison to conventional emulsion primed removable pressure sensitive adhesive constructions.

14 Claims, 12 Drawing Sheets

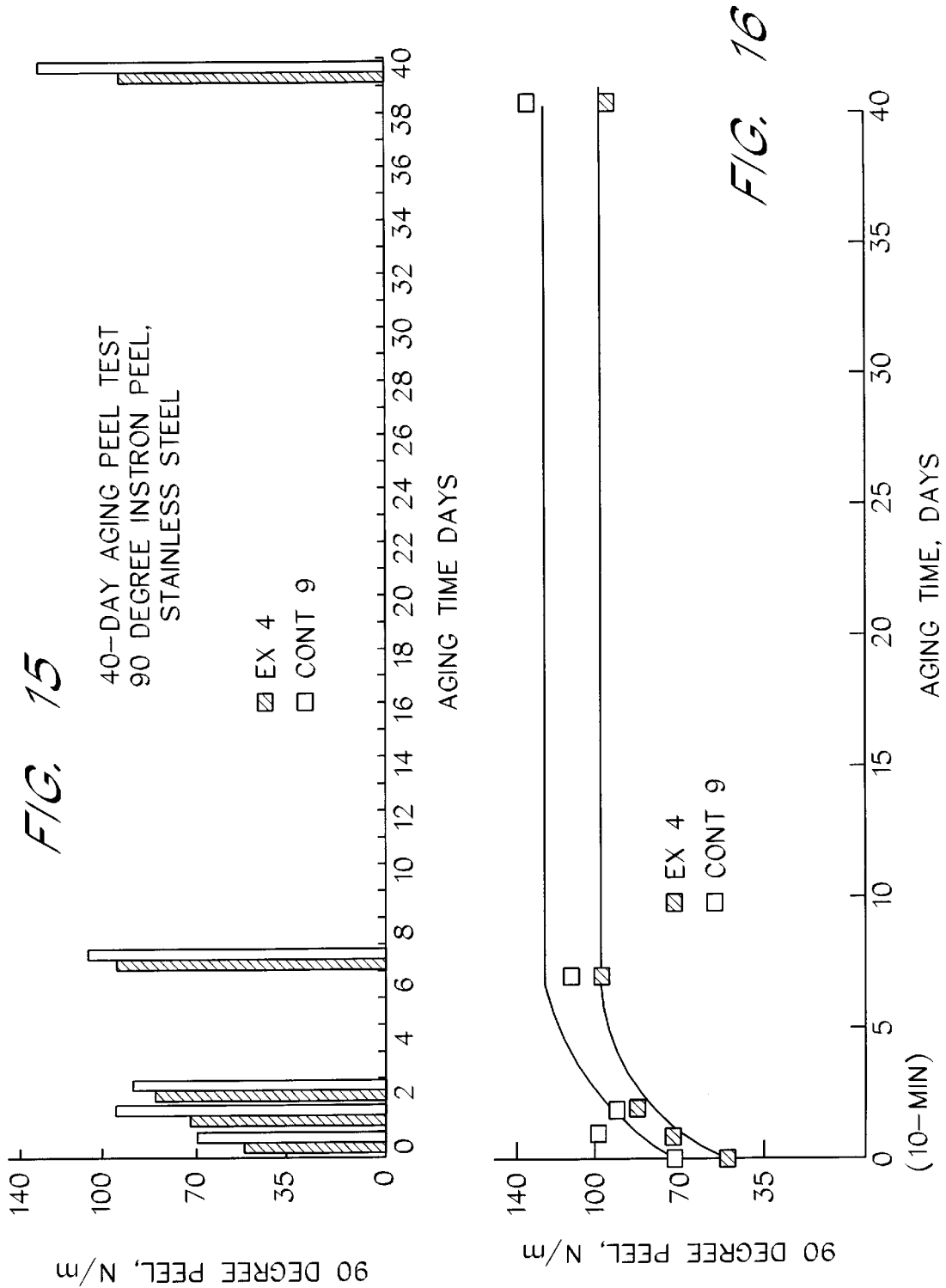

PRIMERLESS PRESSURE-SENSITIVE ADHESIVE CONSTRUCTIONS

This application is a continuation of prior application Ser. No. 08/528,082, filed Sep. 14, 1995 now pending, which is a continuation-in-part of application Ser. No. 08/307,944 filed Sep. 16, 1994, now issued as U.S. Pat. No. 5,558,913 to Sasaki et al.

FIELD OF THE INVENTION

The invention relates to removable pressure-sensitive adhesive tape and label constructions.

BACKGROUND OF THE INVENTION

A pressure-sensitive adhesive label constructions comprises a laminate of a facestock or backing, a layer of a pressure-sensitive adhesive and a release liner providing a release surface for the pressure-sensitive adhesive.

In tape constructions, a release is applied to the side of the facestock or backing opposed to the side in contact with the pressure-sensitive adhesive to provide the release surface which enables the facestock and pressure-sensitive adhesive to be peeled away from a contiguous layer of facestock and adhesive.

Pressure-sensitive adhesives (PSA) normally fall into one of two categories, permanent and removable.

Permanent pressure-sensitive adhesives are adhesives which have a level of adhesion which does not allow the removal of the label from the substrate to which it has been applied without considerable damage to a paper facestock such as tearing or for stronger facestock such as polyester, adhesive failure at the facestock, cohesive failure in the body of the adhesive or leaving, by transfer, a significant amount of adhesive on the substrate.

The adhesive of removable pressure-sensitive adhesives is considerably lower, allowing removal of the facestock or label with adhesive from the substrate even after a protracted period of contact. Removal is without significant damage to the facestock or substrate. Typically, a removable pressure-sensitive adhesive will have a bond of about 50 to about 300 N/m to stainless steel.

The limitation on the use of removable pressure-sensitive adhesives for the tape and label constructions is that a primer is needed to enable adequate anchorage to the facestock and, for some removable pressure-sensitive adhesives, to prevent staining of paper facestocks.

Traditionally the primer has been deposited as a barrier coat from a solution of a polymer in an organic solvent such as toluene. Ethylene-vinyl acetate and styrenic polymers both filled and unfilled have been employed.

Environmental considerations, however, have mandated a reduction in the amount of solvent employed in industry.

Aqueous, emulsion-based primers for facestocks have been tried as replacements, but impart curl to a paper facestock. Curl can be removed by remoisturizing the paper, but at an additional cost. Many papers, moreover, have a glossy surface and remoisturization reduces gloss and the quality of the product is adversely affected. This is not acceptable in industry.

In addition, many coaters do not have a primer-coating station or an oven to dry the primer coat. It would be desirable, therefore, to provide an alternate route to providing removal pressure-sensitive adhesive constructions which would not involve the use of solvent-based primer systems.

Dual and multiple die coatings on substrates are well known in the art and described for instance in U.S. Pat. No. 3,573,965 incorporated herein by reference.

U.S. Pat. No. 4,260,659 to Gobran, incorporated herein by reference, describes a multilayer pressure-sensitive adhesive tape formed of a plurality of superimposed pressure-sensitive adhesive strata the outer strata of which being significantly softer than the strata immediately underlying it.

U.S. Pat. No. 4,854,259 to Kuller, incorporated herein by reference, describes a process for producing a pressure-sensitive adhesive tape comprising a plurality of concurrently coated superimposed layers, at least one outer layer of which being a pressure-sensitive adhesive layer, with contiguous layers defining an inner phase therebetween each layer comprising a photo polymerized matrix of polymer chains extending from matrix of one layer through the interface to the matrix of a contiguous layer. As consequence thereof, the layers cannot be delaminated.

The current method of manufacture of a removable pressure-sensitive adhesive label stock is depicted in FIG. 1. With reference thereto a facestock or backing web is coated with a primer from a solvent and oven dried to form a web of primed backing. Contemporaneously, a web of release liner is coated with a removable pressure-sensitive adhesive, which is oven dried. The laminate of removable pressure-sensitive adhesive and the release liner is combined with the formed primed facestock to form a final laminate of facestock, primer, removable pressure-sensitive adhesive and release liner. It is also feasible to apply the removable PSA directly to the primer and laminate that subassembly to the release liner. For tape constructions the release liner is eliminated and a release agent is applied to the surface of the backing opposed to the surface in contact with the removable pressure-sensitive adhesive.

This is a multi-step and costly process and it would be desirable to make the construction of removable pressure-sensitive adhesive product less costly without jeopardizing the performance of the removable pressure-sensitive adhesive. This is the subject of the instant invention.

SUMMARY OF THE INVENTION

It has now been found that tape and label constructions based on the use of removable pressure-sensitive adhesives can be formed by use of a permanent pressure-sensitive adhesive in place of the primer as an anchor and a barrier layer for securing a removable pressure-sensitive adhesive layer to a backing. The combination may also be used to adjust adhesion to any levels between the adhesion of the permanent pressure-sensitive adhesive and the adhesion of the removable pressure-sensitive adhesive.

The construction comprises a web of backing or facestock in contact with a layer of a permanent pressure-sensitive adhesive which is in turn in contact with a layer of a removable pressure-sensitive adhesive. The removable pressure-sensitive adhesive is in turn in contact with either a release surface of a release liner or a release surface on the opposed surface of the backing.

In order to retain removable pressure-sensitive properties, it is necessary to limit the relative amount of permanent pressure-sensitive adhesive employed. For a typical total pressure-sensitive adhesive coat weight of 18–25 grams per square meter (gsm herein), the coat weight of the removable pressure-sensitive adhesive coast is at least about 50% of the gsm and the coat weight ratio of removable pressure-sensitive adhesive layer to permanent pressure-sensitive adhesive layer is at least about 1:1, more preferably about 3:1, still more preferably about 4:1 or more. At higher coat weight levels of permanent adhesive, e.g., about 50% of the coat thickness, the adhesivity approaches that of the permanent pressure-sensitive adhesive. The layers of removable and permanent pressure-sensitive adhesives are expeditiously applied to a web of facestock by co-extrusion from a dual die of respective removable and permanent pressure-sensitive adhesives from emulsions onto the release liner or the backing, drying the layers and laminating the subconstruction to a backing or release surface. Simultaneous dual layer coating eliminates many operating steps and significantly reduces the cost of tape and sheet stock construction. The total coating thickness and thicknesses of each layer are controlled by metering of the amount of permanent and removal pressure-sensitive adhesives respectively discharged from each orifice of the dual die.

BRIEF DESCRIPTION OF THE DRAWINGS

Attached

FIG. 15 shows 90° adhesion to steel for the composition of Example 4 and Control 9 as a function of time.

FIG. 16 is another plot of the information as contained in FIG. 15.

DETAILED DESCRIPTION OF THE PREFERRED EMBODIMENT

The present invention is directed to tape and label constructions employing removable pressure-sensitive adhesives in which the layer of removable pressure-sensitive adhesive is adhered to a layer of permanent pressure-sensitive adhesive, which is in turn adhered to the facestock or backing.

Figure 1:
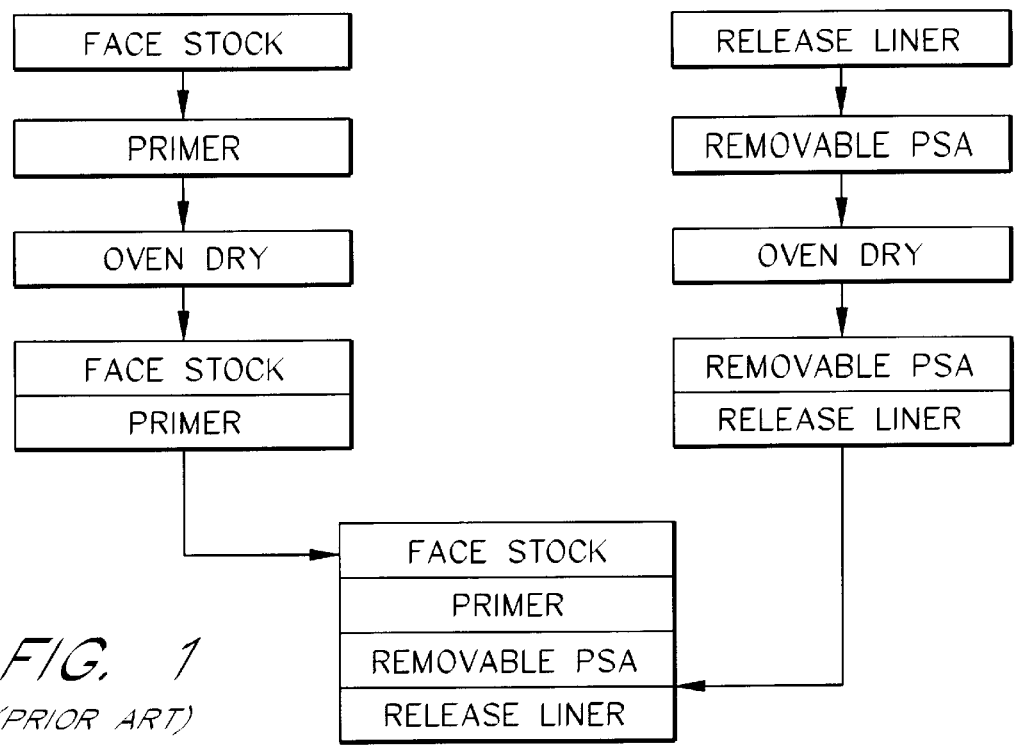
FIG. 1 shows, in block diagram, the current method of manufacture of a removable pressure-sensitive adhesive label stock construction.
Figure 2:
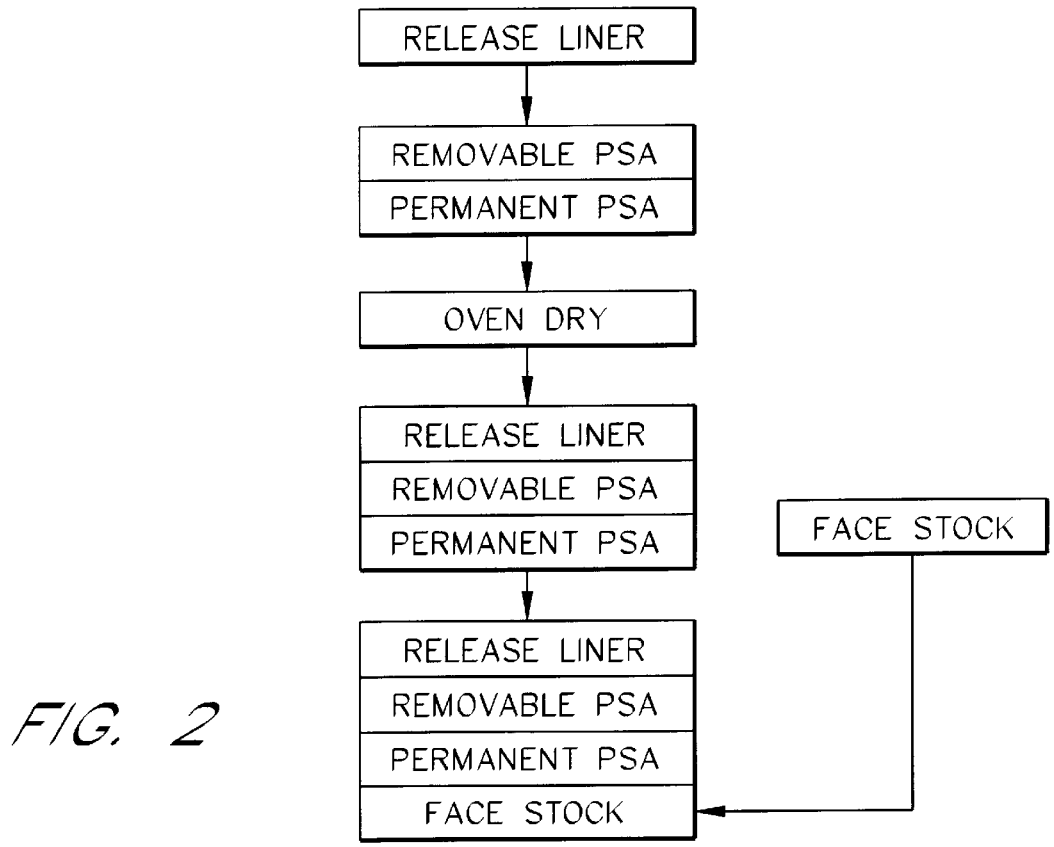
FIG. 2 illustrates, in block diagram, the method of manufacture of a removable pressure-sensitive adhesive label stock construction according to the instant invention.

Pressure-sensitive adhesive constructions of the invention, when for label applications, are, with reference to FIG. 2, preferably prepared by coating layers of permanent and removable pressure-sensitive adhesives (PSA) onto a silicone release liner using a dual die. The adhesives contemplated to be employed are emulsion pressure-sensitive adhesives and are simultaneously pumped through adjacent orifices of the dual die and coated onto the release liner. The principle, however, applies to solvent based and hot melt adhesives the later employing cooling of the melt instead of drying to set the pressure-sensitive adhesive layers. As depicted, the laminate of the release liner, the removable pressure-sensitive adhesive and permanent pressure-sensitive adhesive is then passed through an oven to dry the applied layers if needed. Temperature is about 180° F. Following drying, the laminate of the release liner, removable pressure-sensitive adhesive and permanent pressure-sensitive adhesive are laminated to a web of facestock or backing.

While not shown, if the release liner is eliminated, as in the case of tape manufacture, then the layers of permanent pressure-sensitive adhesive and removable pressure-sensitive adhesive are dual die-coated onto one side of a web of paper to be slit and the reverse side is coated with a suitable release material to provide a release surface. The formed laminate of paper, permanent sensitive adhesive and removable pressure-sensitive adhesive is then wound into a roll for slitting into tapes. The construction made according to FIG. 2 is normally processed and cut into labels with or without matrix removal. It will be appreciated further that the entire process of FIG. 2 could be reversed and the layers of removable and permanent pressure-sensitive adhesive could be applied by a dual die directly to the facestock, the adhesive layer set by drying or cooling and then laminated to the release liner. Both the emulsion removable pressure-sensitive adhesive and the emulsion permanent pressure-sensitive adhesive employed in the practice of the invention should be of a viscosity sufficient that the dual cast layers of removable and permanent pressure-sensitive adhesives will not significantly diffuse at their interfaces. This insures that the properties of the permanent pressure-sensitive adhesive will not, unless desired, adversely impact the properties of the removable pressure-sensitive adhesive. They must be, however, mutually compatible to allow co-casting of discrete layers which will not delaminate.

In general, to achieve a removable pressure-sensitive adhesive, the coat weights of the combination of layers of permanent and removable pressure-sensitive adhesives will be about 18 to about 25, preferably about 20 to about 23 gsm, with at least 50% of the coat weight being the removable pressure-sensitive adhesive. It is preferred, however, that the relative coat weights in gsm of the removable to permanent pressure-sensitive adhesives be at least about 1:1, preferably about 3:1, and more preferably about 4:1 or more. This allows for use of the least amount of permanent pressure adhesive and provides a coat of removable pressure-sensitive adhesive in contact with the coat of permanent pressure-sensitive adhesive with the minimal influence of the permanent pressure-sensitive adhesive on the properties of the removable pressure-sensitive adhesive.

At permanent pressure-sensitive adhesive thicknesses above about 50% of total thickness, the influence of the permanent pressure-sensitive adhesive becomes significant and the level of adhesion builds significantly. This effectively allows use of relative thicknesses of removal and permanent adhesives to control adhesion to substrates.

The pressure-sensitive adhesives employed in the instant invention may be any emulsion acrylic or rubber resin removable and permanent pressure-sensitive adhesives that are sufficiently compatible to form two discrete layers with minimal diffusion between layers. It is presently preferred to employ emulsion based pressure-sensitive adhesive. In the construction, the permanent pressure-sensitive adhesive will have enough aggression to the facestock to preferentially bond the removable pressure-sensitive adhesive to the facestock as opposed to allowing adhesive transfer to normal substrates. These include paper, recyclable card-board, polyolefins, polyvinyl chloride, glass, stainless steel, painted surfaces and the like. In sum, the layer of permanent pressure-sensitive adhesive serves to aggressively anchor the removable pressure-sensitive adhesive to the backing, and when the backing is paper, provide a barrier which prevent paper staining.

The use of a continuous permanent pressure-sensitive adhesive layer sandwiched between the continuous removable pressure-sensitive adhesive layer and facestock can be used to make a variety of constructions. For instance, the permanent pressure-sensitive adhesive layer may be a repulpable pressure-sensitive adhesive and the removable pressure-sensitive adhesive layer may be repulpable or non-repulpable. In either event using a repulpable permanent pressure-sensitive adhesive layer can enable separation from a paper facestock as part of the stock recovery. More significantly, the permanent pressure-sensitive adhesive can be tailored to the nature of the facestock while the removable can be selectively tailored to the nature of the substrate to which the construction is designed to be applied.

The preferred removable pressure-sensitive adhesive compositions comprise acrylic-based emulsion polymers which exhibit low peel adhesion, preferably on the order of about 50 to 300 N/m on stainless steel.

The acrylic-based emulsion polymers for removable and permanent pressure-sensitive adhesive comprise from about 75 to 98% by weight acrylic acrylate monomers preferably about 85 to about 98% by weight. Amounts of alkyl acrylate monomers below 85% are not presently preferred except as part of a repulpable pressure-sensitive adhesive because the resultant glass transition temperature of the adhesive may be too high and the adhesion loses tack. Polymers having more than about 98% alkyl acrylate monomers are not preferred because the polymers tend to exhibit insufficient cohesive strength and leave stains or residue when peeled away from substrates. An amount of from about 85% to about 98% by weight alkyl acrylate monomers is presently preferred for the removable pressure-sensitive adhesive.

The alkyl acrylate monomers preferably contain from 1 to about 12 carbon atoms in the alkyl chain and more preferably the alkyl acrylate monomers contain from about 4 to about 8 carbon atoms in the alkyl chain.

Diesters of alpha, beta unsaturated dicarboxylic acids may also be beneficially used especially for the permanent pressure-sensitive adhesive.

For removability, polymers with at least the majority of the alkyl acrylate monomers having from about 4 to about 8 carbon atoms in the alkyl chain are presently preferred as providing the optimum balance of hardness, adhesion and removability. Exemplary alkyl acrylates suitable for use in the present invention include 2-ethylhexyl acrylate, butyl acrylate, heptyl acrylate, octyl acrylate, isooctyl acrylate, isobutyl acrylate and the like. Butyl acrylate and 2-ethylhexyl acrylate are presently preferred.

Up to about 15% of the monomers forming the polymer may be hard monomers. Preferred hard monomers include vinyl acetate, styrene, methyl methacrylate, vinyl pyrrolidone and the like.

The polymer composition may comprise up to about 25% of a polar monomer or blends of polar monomers to impart mechanical stability and cohesive strength or repulpability to the polymer. By the term "polar" monomer is meant organic carboxylic acids, amides and alcohols and the like. Examples of polar monomers include methacrylic acid, acrylic acid, itaconic acid, maleic acid, acrylamide, methacrylamide, 2-hydroxy ethyl acrylate and the like.

The polymer may comprise up to about 1% by weight of an internal crosslinking agent. The term "internal crosslinking agent" is meant to include polyfunctional compounds having at least two non-conjugated carbon-carbon double bonds per molecule which agent becomes part of the polymer during polymerization. It has been found that the amount of internal crosslinking agents should not exceed about 1%, as amounts greater than 1% tends to reduce stability of the acrylate-based emulsion from which the polymers are prepared. This results in coagulation of the emulsion particles during preparation. An amount of the internal crosslinking agent above about 0.3% are not preferred as no additional benefit is typically observed. Examples of suitable internal crosslinking agents include diallyl maleate, diallyl phthalate and multifunctional acrylates and methacrylates including polyethylene glycol diacrylate, hexanediol diacrylate, ethoxylated trimethylolpropane triacrylate, pentaerythritol triacrylate, propylene glycol diacrylate and trimethylolpropane trimethacrylate and the like.

The polymer systems may further comprises an external crosslinking agent which causes post polymerization crosslinking in an amount up to about 2% by weight, and preferably from about 0.1 to about 0.7% by weight. External crosslinking agents include metal salts such as zirconium ammonium carbonate, zinc ammonium carbonate, aluminum acetate, zinc acetate and chromium acetate. Amounts of external crosslinking agent greater than about 2% are generally not employed because of undesirable loss of adhesion.

The presently preferred removable acrylic pressure-sensitive adhesives are adhesives containing adhesive polymers formed from a blend of about 98% by weight 2-ethylhexyl acrylate or isooctyl acrylate and about 2% by weight carboxylic acids in particular, acrylic and methacrylic acids.

The permanent pressure-sensitive adhesives which serve as anchoring agent between the removable pressure-sensitive adhesive layer and the backing or facestock are preferably high performance acrylic-based pressure-sensitive adhesive which contain greater amounts of polar monomers. Aggressiveness can also be enhanced by use of a tackifier. Some of such pressure-sensitive adhesives are described in U.S. Pat. No. 5,164,444 incorporated herein by reference and generally contain from about 35 to 60% by weight of at least one alkyl acrylate, about 15 to 35% of at least one vinyl ester, about 20 to 40% by weight of a diester of a dicarboxylic acid, preferably di-2-octyl maleate or di-2-ethyl hexyl fumarate and about 3% by weight of unsaturated carboxylic acid.

Figure 3:
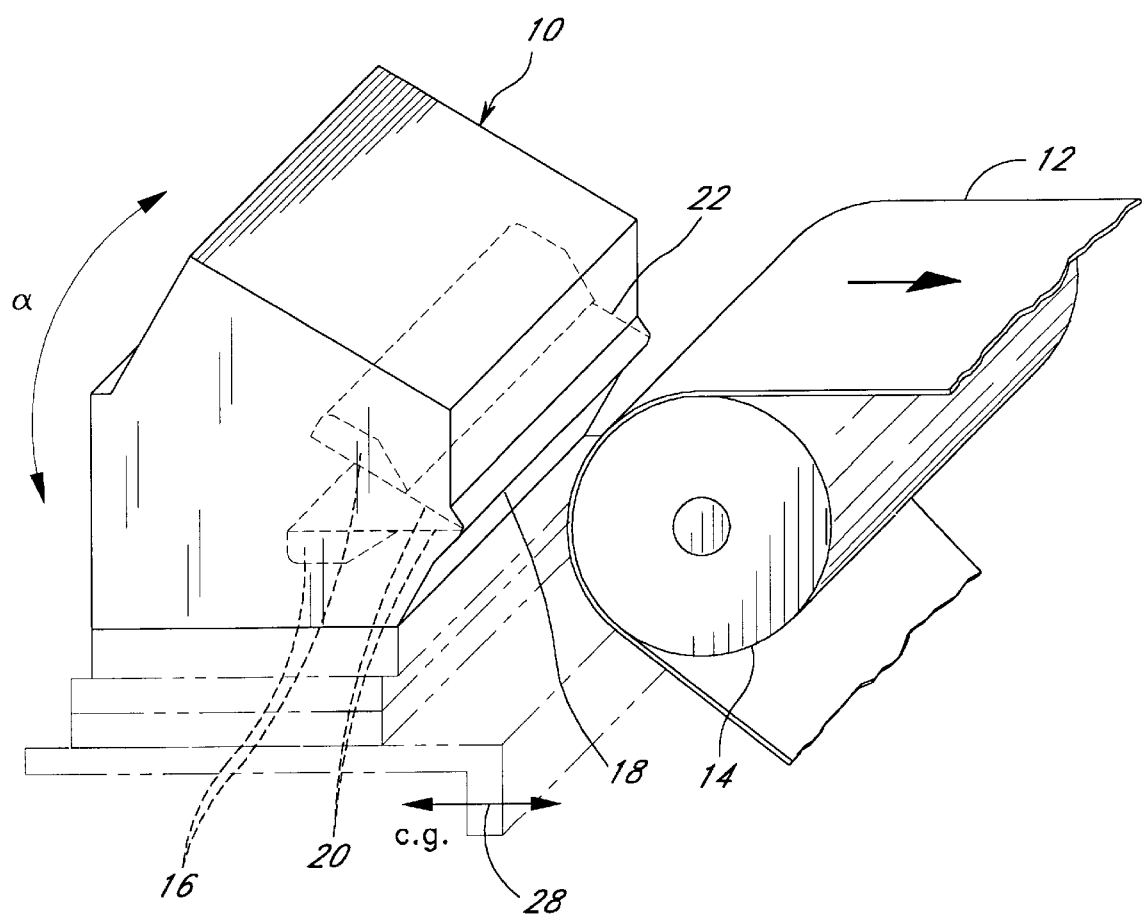
FIG. 3 is a schematic diagram of a dual die used to apply the adhesive formulations of the present invention.

The presently preferred method of manufacture uses a multilayer or dual die 10 such as that illustrated in FIG. 3 for the application of two contiguous adhesive layers, i.e., removable and permanent, to the release surface of a web of a release liner substrate 12. The web 12 travels around a back up roll 14 as it passes the distal end of the multilayer die 10. As shown in FIG. 3, it will be understood that both the die 10 and the web 12 have substantially equal width such that the entire width of the substrate is coated in one pass by the fluid flowing out of the die 10 and onto the web 12. In this case, two separate fluid layers are flowing out of manifolds 16 formed in the die and along individual slots 20 which are defined by the die's distal lands 22. The slots 20 each communicate with the interface between the web 12 and the distal most tips 18 of the die 10. These tips are referred to as the "die lips" 18 and are illustrated and described in more detail in connection with FIG. 4 below.

Figure 5:
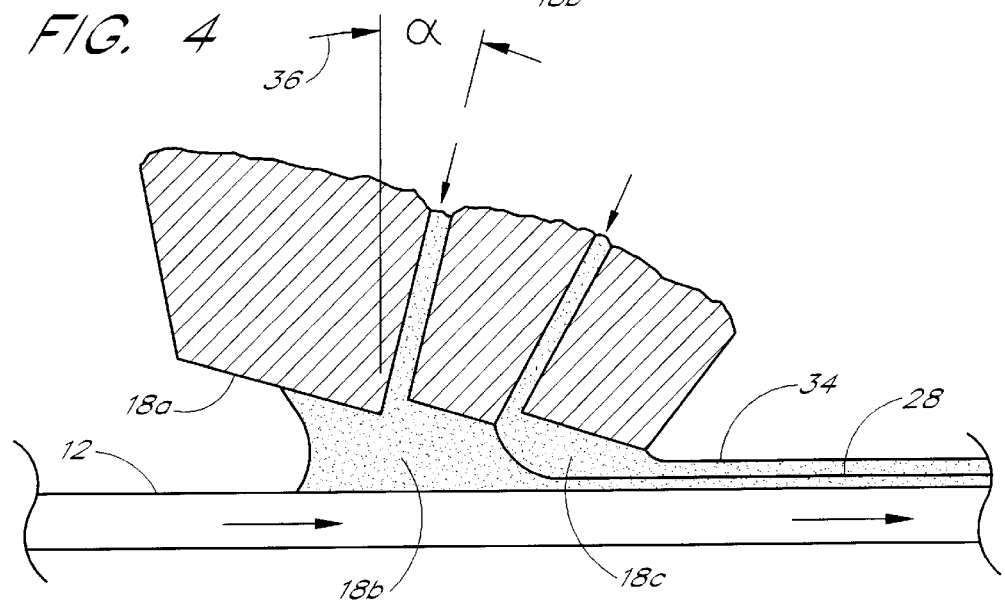
FIG. 5 is a cross-sectional schematic showing an angled lip structure of the dual die as it is applying two layers of adhesive.

The multilayer die 10 is modular, thus allowing for variations in the individual slots 20 and lip 18 configurations without necessitating modifications to the other slots and lips. Thus, these geometries can be adjusted in order to achieve successful coating. Other variables include the "coating gap" (c.g.) and the "angle of attack" ($\alpha$) of the die. As illustrated in FIG. 3, the coating gap is the distance that the lips 18 are set back from the web. The angle of attack ($\alpha$) is the degree of angular adjustment of the lip surfaces and of the entire die with respect to the outer pointing normal of the web as illustrated in FIG. 5. Another variable is the web speed which may vary between about 50–1,000 feet per minute, and more.

Either one or two die coating methods may be utilized: interference coating or proximity coating.

In the former case, the lips 18 of the die actually are pressed forward in the direction of the web 12, but do not contact the web nor, therefore, cause any damage thereto, because they hydroplane on a thin layer of adhesive coating material. However, the pressure may actually cause the back up roll 14 (typically constructed from a hard rubber material) to deform in order to relieve the pressure of the die against the lips 18.

In proximity coating, the lips 18 of the die 10 are positioned a precise distance from the web 12 and are not pressed toward the web. The back up roll 14 is typically constructed from stainless steel which allows for precision in the circumference of the roll and minimizes roll run out.

In the coating process, very thin layers of high viscosity emulsion adhesive compositions are coated at relatively high web speeds. The process is carefully controlled.

Figure 4:
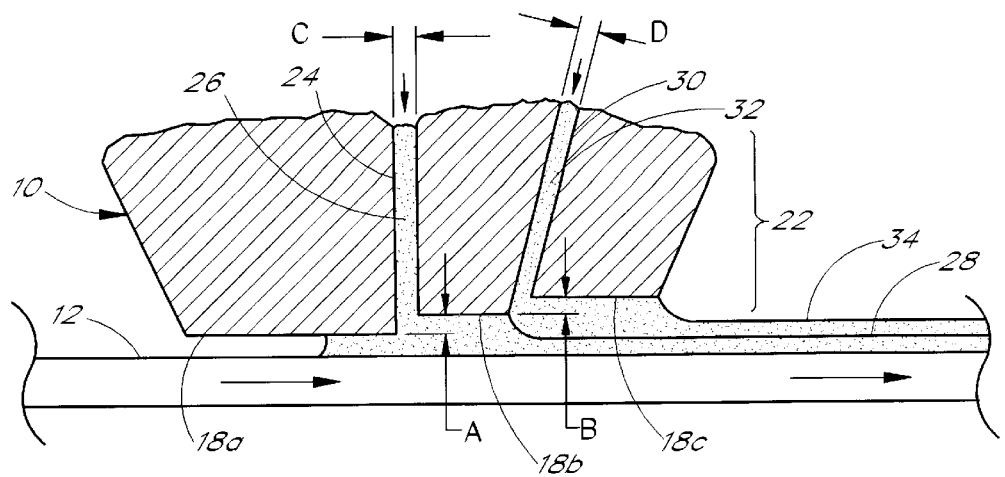
FIG. 4 is a cross-sectional schematic view showing the lip structure of the dual die of FIG. 3 as it is applying two layers of adhesive.

Such control is accomplished in the instant multilayer die coating technique, in part by the geometry and configuration of the die lips 18. Referring to FIG. 4, there is shown a close up view of the distal most tips 22 of the multilayer die of FIG. 3, including the lips 18 associated with each slot, showing the interface or coating gas with respect to the web 12. With respect to FIG. 4, it should be noted that, for ease of illustration, the die 10 is shown rotated 90° from the position shown in FIG. 3. Moreover, the web 12 is shown in a horizontal arrangement, when in actuality, there may be a slight curvature to the web 12 and back up roll 14; however, the distances involved are so short that a good approximation of the fluid dynamics can be achieved by assuming a horizontal web 12.

For consistent reference, the individual lips 18 of the multilayer die 10 shall be referred to with respect to the direction of travel of the web 12. For example, the lip 18a shown in the left in FIG. 4 will be referred to as the "upstream lip," while the right most lip 18c shall be referred to as the "downstream lip." Thus, the "middle lip" 18b will have the same reference. Accordingly, the upstream and middle lips 18a, 18b define an upstream feed gap 24 through which an emulsion adhesive material 26 flows onto the web 12 to form a bottom removable pressure-sensitive adhesive layer 28 of a multilayer adhesive product. Likewise, the middle lip 18b and the downstream lip 18c together form a slotted feed gap 30 through which emulsion adhesive material 32 flows onto the top of the lower layer 28 as the web travels in left-to-right direction, as illustrated in FIG. 4. This forms a top permanent pressure-sensitive adhesive layer 34 of the multilayer adhesive product. Again, for ease of illustration, the top layer 34 is shown as a darker colored material, but this may not necessarily be the case in actual production; for instance, various colors or tags such as ultra violet fluorescent dye may be utilized to facilitate measurement of individual layer thicknesses.

Coating of viscous adhesives at these web speed rates can involve a number of problems. For example, recirculations in the flow of either the bottom or top adhesive layers can result in certain defects in the final multilayer product. Such recirculations may occur if the separation point of either liquid adhesive with respect to the die lips 18 occurs at an inappropriate location. In addition, extreme pressure gradient can result in the upstream leakage of liquid out of the coating gate area, again causing defects in the end product due to nonuniform adhesive layer thicknesses, etc. Moreover, these and other adverse effects result in the diffusion of one layer in the other, since they are being coated simultaneously in the liquid state. Such diffusing jeopardizes the integrity and performance of the resulting product.

Thus, it has been found, with respect to the multilayer die coating described herein, that it is very important to control the pressure gradients of the adhesives under each lip. In particular, the top layer should separate from the middle lip at the downstream corner of this lip. In order to achieve such coating control, it will be noted from FIG. 4 that the lips 18 of each die section are stepped or spaced away from the web 12 in the downstream direction. This allows the lips to generate the appropriate pressure gradient and to ensure smooth flow of the adhesive and uniform layer thicknesses. The adjustment of a number of run parameters are necessary in order to achieve this goal. For example, the coating gaps at lip 18b and 18c should be approximately in the range of one to three times the compounded wet film thickness of the layers being fed from upstream of said lip. Under the upstream lip 18a, the net flow rate is necessarily zero, and a turn around flow is the only possibility. Thus, the coating gap under this lip is solely set in order to avoid leakage of the liquid out from the coating gap in the upstream direction. Moreover, the upstream step, defined as dimension A in FIG. 4, and the downstream step, defined as dimension B, may range anywhere from zero to about 4 mils (0 to 0.004 inch). The feed gaps (defined as dimensions C and D in FIG. 4) can also be adjusted anywhere between about one and about 15 mils (0.001 inch to 0.015 inch), preferably not to exceed five times the wet film thickness of their correspondent layers. In addition, the length of the lips 18 in the direction of web travel play an important role in achieving the proper pressure gradient. Thus, the upstream lip 18a should be approximately two millimeters in length, or more, as necessary to seal the head as noted above. The downstream lip 18c and middle lip 18b may fall within the range of 0.1–3 mm in length.

It will be recognized that one of ordinary skill in the art can adjust these various parameters in order to achieve the proper fluid dynamics for uniform layer coating. Of course, persons of more than ordinary skill can adjust the die and run parameters more precisely in order to achieve good results. However, such persons are not always readily available in production settings. Therefore, it is advantageous to provide a die geometry which will increase the size of the window of successful multilayer coating operation. This can be achieved by certain adjustments in the orientation of the die lips.

Thus, FIG. 5 illustrates the die 10 of FIG. 4 rotated slightly in the clockwise direction representing an "angle of attack $\alpha$." For consistent reference, the angle of attack ($\alpha$) shown in FIG. 4 represents a negative angle of attack, or a "converging" orientation of the downstream lip 18c with respect to the web 12. This converging lip orientation provides a negative pressure gradient (in the direction of web travel), along the downstream lip 18c, which is beneficial in preventing a coating defect well known as "ribbing," a pattern of regular striation in the sense of the web travel in the film. The fact that the middle and the upstream lips 18a and 18c also achieve a convergent orientation is not particularly beneficial. Although the angle of attack of the die can be varied widely in order to achieve these advantages, it has been found that angles in the rate of 0° to −5° are appropriate.

Figure 6:
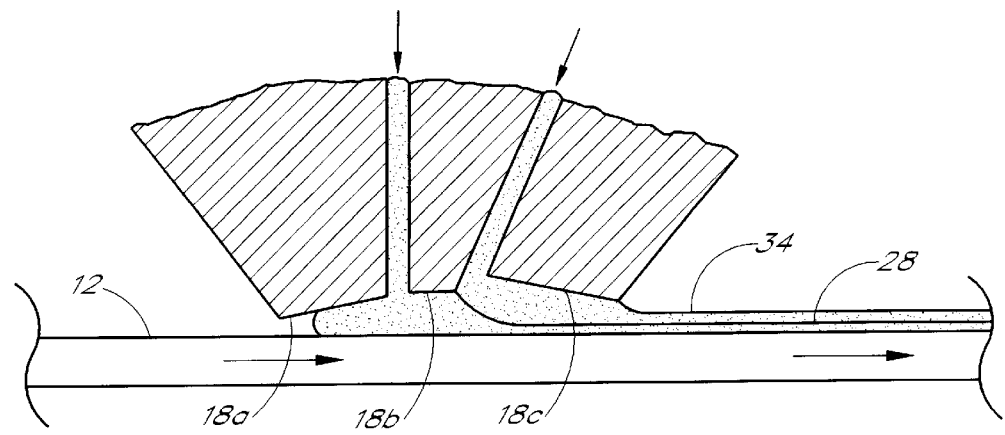
FIG. 6 is a cross-sectional schematic of a dual die featuring a beveled lip structure.

An even further successful operating window can be achieved with additional lip modifications. Shown in FIG. 6 is a variation of the lip configuration of FIG. 5 illustrating "beveled" lips. In this configuration, the downstream lip 18c is angled or beveled so as to have a converging profile, similar to that shown in FIG. 5. However, the middle lip 18b is positioned so as to be flat or parallel with respect to the web 12. The upstream lip 18a, on the other hand, is beveled so that it is diverging from the web 12 in the downstream direction. This configuration, again, provides the appropriate pressure gradient under the individual lips to avoid recirculations and upstream leakage. Moreover, if perturbations in the coating conditions occur (such as, for example, due to roll run out, foreign objects on the web, variations in ambient pressure, etc.), the converging configuration of the upstream lip 18a shown in FIG. 6 will produce a dampening effect on flow conditions so that defects in the coating layers do not occur. In this manner, the multi-layer coating bead acts as a nonlinear spring to dampen out such unwanted events in order to return to steady state. The die 10 can then be adjusted in accordance with standard angle of attack variations to achieve favorable coating conditions. Because the lips 18 are predisposed or beveled in a favorable orientation, the adjustment of angle of attack, as well as coating gap, need not be so precise. Thus, persons of ordinary skill or even less skill can successfully achieve good coating results.

In the ensuing Examples and Controls, R-1 is a removable pressure-sensitive adhesive deposited from a high viscosity emulsion of an acrylic co-polymer formed of 98% by weight 2-ethylhexyl acrylate and 2% by weight of a mixture of acrylic and methacrylic acids. The emulsion utilizes an anionic surfactant. Solids content is 66 to 65% and the emulsion thickened with an organic thickener. R-2 is the same emulsion as R-1 but without the thickener. R-3 is a 61–63% solid emulsion of a plasticized copolymer of 98% 2-ethylhexyl acrylate and 2% by weight of a mixture of acrylic and methacrylic acids. P-1 is a tackified acrylic emulsion copolymer formed in the presence of an anionic surfactant. P-2 is an emulsion polymer formed of 2-ethylhexyl acrylate/di-2-octyl maleate/vinyl acetate/acrylic acid/methacrylic acid in relative weight ratios of 48/29/21/1.5/0.5 and formed in the presence of dodecyl mercaptan.

The basic tests were performed in evaluating adhesive performance, the Quickstick and 90° Peel Adhesion. Quickstick is conducted according to FINAT Test Method No. 9 (FTM 9), and 90° Peel adhesion according to FINAT Test Method No. 2 (FTM 2).

The FTM 9 measures tack of a pressure-sensitive adhesive and allows comparison of "initial grab" or "application tack" of adhesives. The Quickstick value is expressed as the force in Newtons per meter (N/M) required to separate, at a specified speed, a loop of material with adhesive facing outward, which has been brought into contact with a specific area of a standard or test surface. Using a tensile tester a loop of a sample approximately 25 mm wide is caused to descend to then immediately removed from the test surface. The rate is 300 mm per minute. The area of contact is approximately 25 mm×25 mm.

FTM 2 also employs a sample 25 mm wide. Its adhesive coating surface is applied to a selected test surface with light finger pressure and rolled with a standard FINAT test roller to obtain intimate contact between adhesive mass and the substrate surface. After a predetermined recorded period of time, the test strip is peeled from the surface at an angle of 90° to the surface at the rate of 300 mm per minute and reported in Newtons per meter.

Both tests are conducted at temperature of 23° C.±2° C. and at a 50% Relative Humidity ±5% RH.

EXAMPLES 1 AND 2 AND CONTROLS 1 TO 5

There was provided for purposes of evaluation of the invention an emulsion of a permanent pressure-sensitive adhesive P-1 and emulsions of removable pressure-sensitive adhesives, R-1 and R-2. The adhesives were cast onto vellum using a dual die and dried to form a laminate of vellum, permanent pressure-sensitive adhesive and removable pressure-sensitive adhesive. These laminates are Example 1 (Ex-1) and Example 2 (Ex-2). These constructions were compared to a commercial removable construction (Control 1), two constructions in which R-2 was cast onto primed vellum (Controls 2 and 3), a construction where R-1 was cast onto unprimed vellum (Control 4) and one where R-2 was cast ont unprimed vellum (Control 5). Coat weights for each construction is shown in Table 1.

TABLE 1

| Coat Weight Grows Per Square Meter (95M) | | | | | |
|---|---|---|---|---|---|
| | P1 | R1 | R2 | R100(a) | primer |
| Cont1 | — | — | — | 20 | N/A |
| Cont2 | — | — | 20 | — | N/A |
| Cont3 | — | — | 20 | — | N/A |
| Cont4 | — | 20 | — | — | — |
| Cont5 | — | — | 20 | — | — |
| Ex1 | 4 | 16 | — | — | — |
| Ex2 | 4 | — | 16 | — | — |

R100(a) is the commercial solvent-based removable.
N/A = unknown

Figure 7:
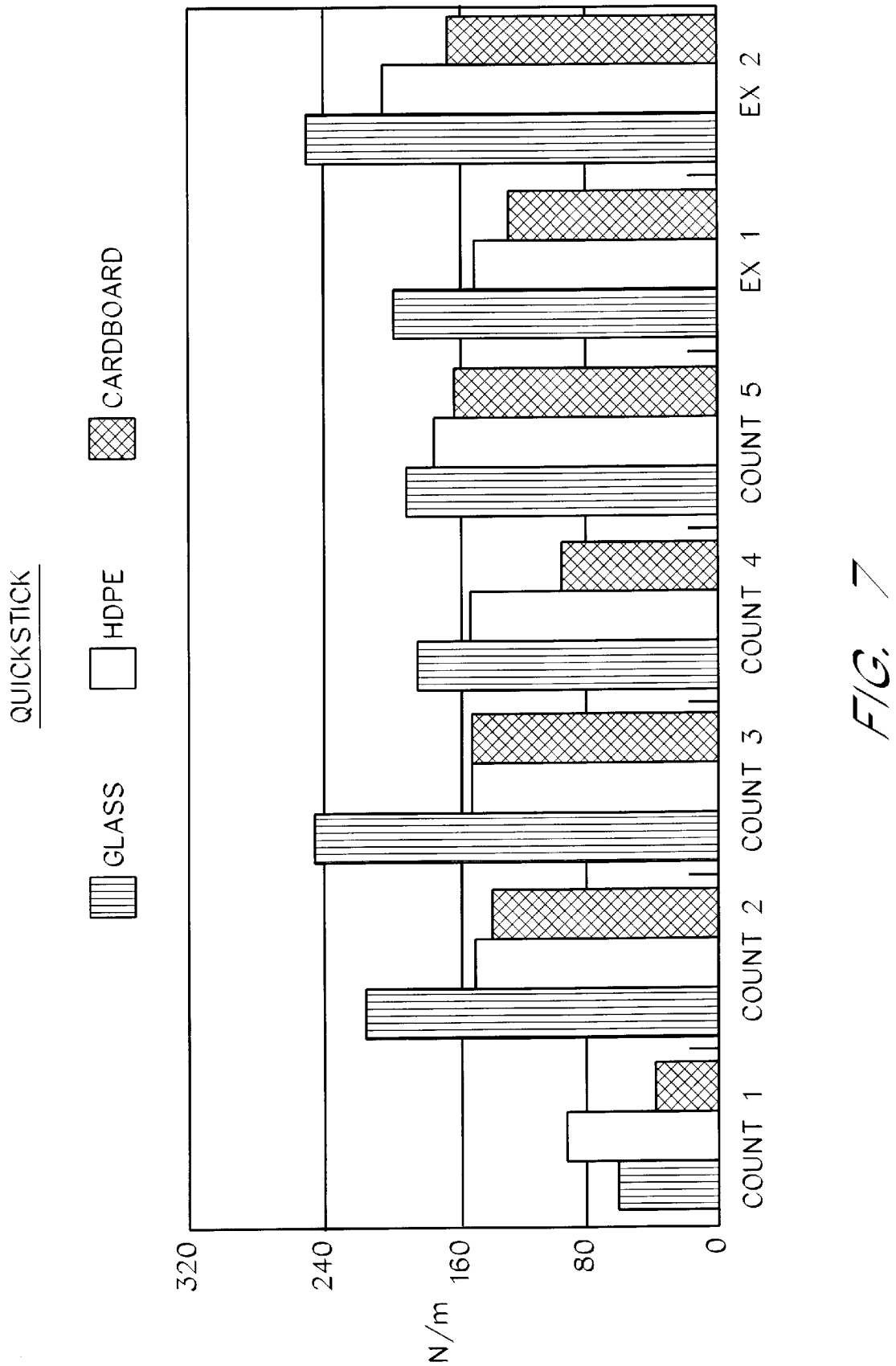
FIG. 7 shows quickstick to glass, high-density polyethylene (HDPE) and recycled cardboard using the compositions of the instant invention and Controls 1 to 5.
Figure 8:
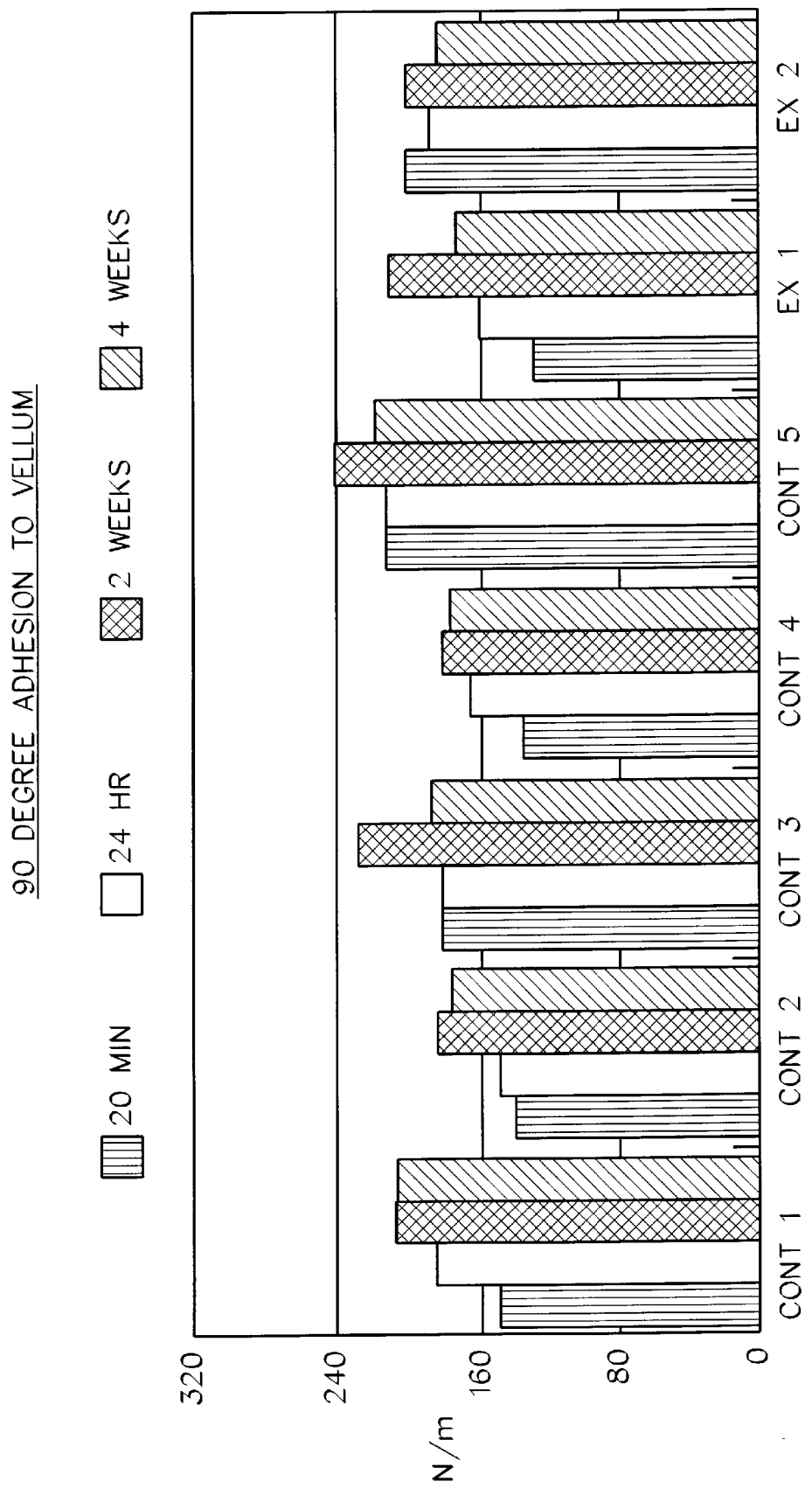
FIGS. 8, 9, 10, 11 and 12 shows 90° peel adhesion to vellum, glass, high density polyethylene (HDPE), cardboard and polyvinyl chloride (PVC) as a function of time for compositions of the invention as compared to Controls 1 to 5.
Figure 9:
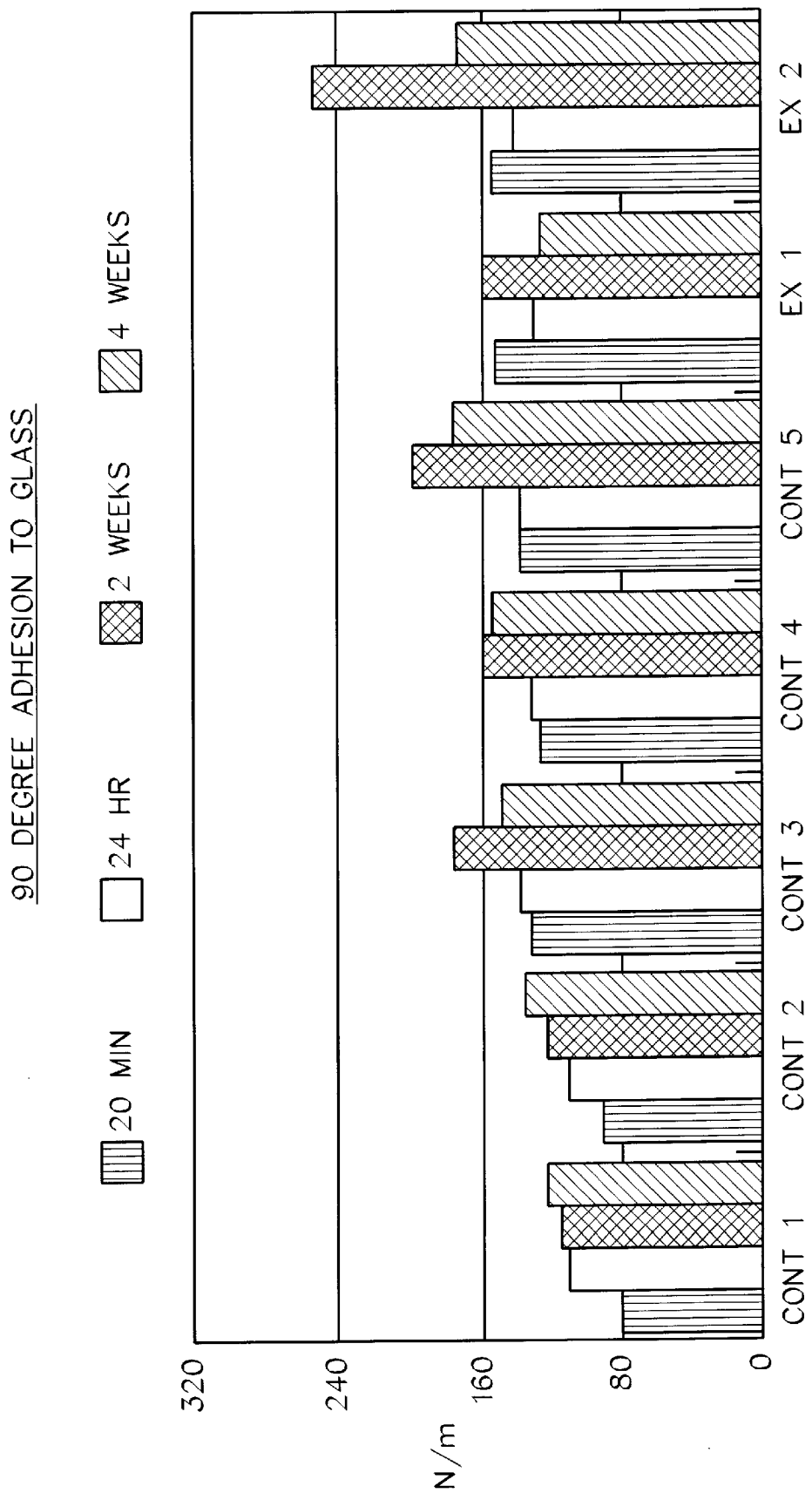
Figure 10:
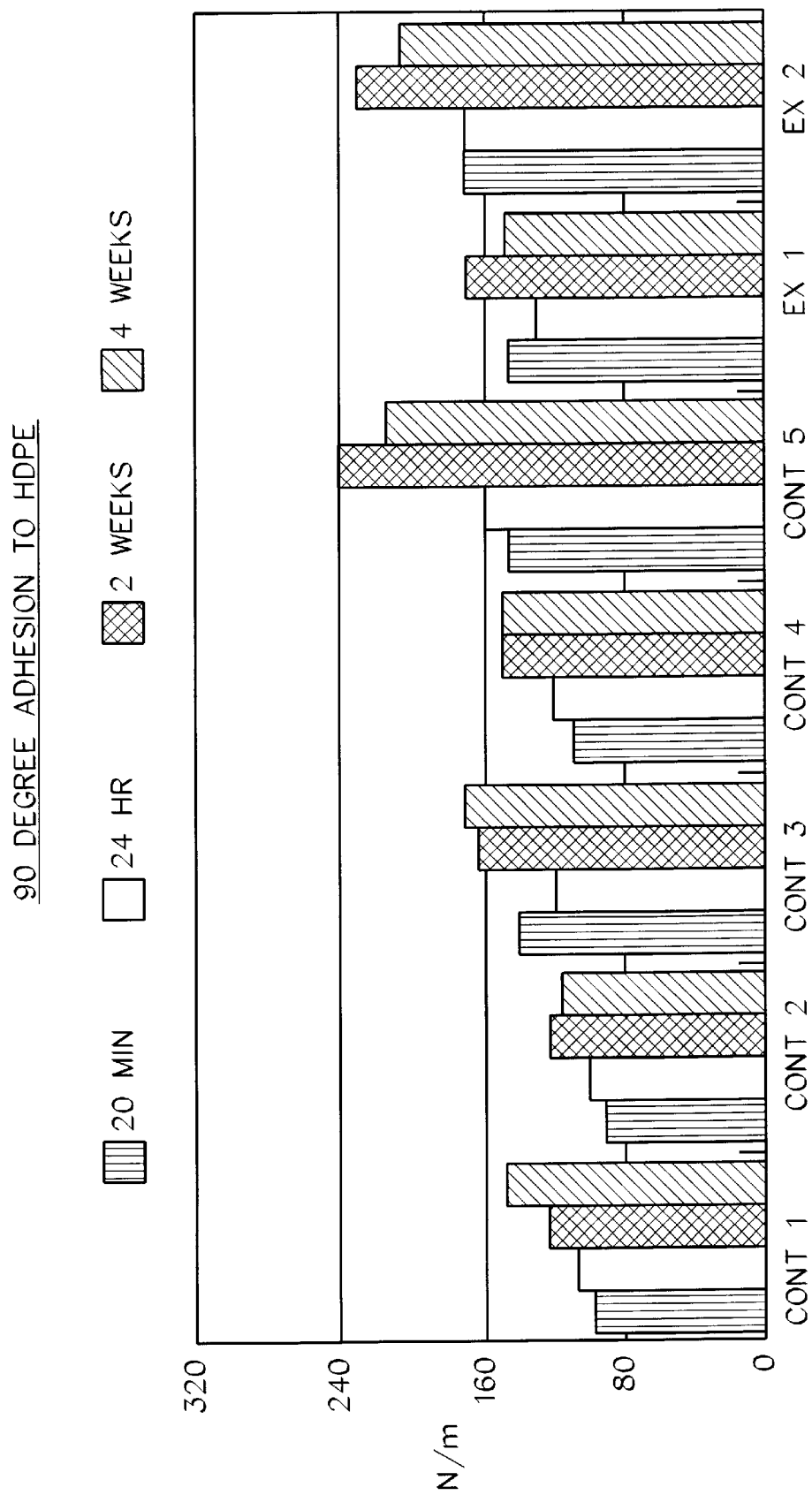
Figure 11:
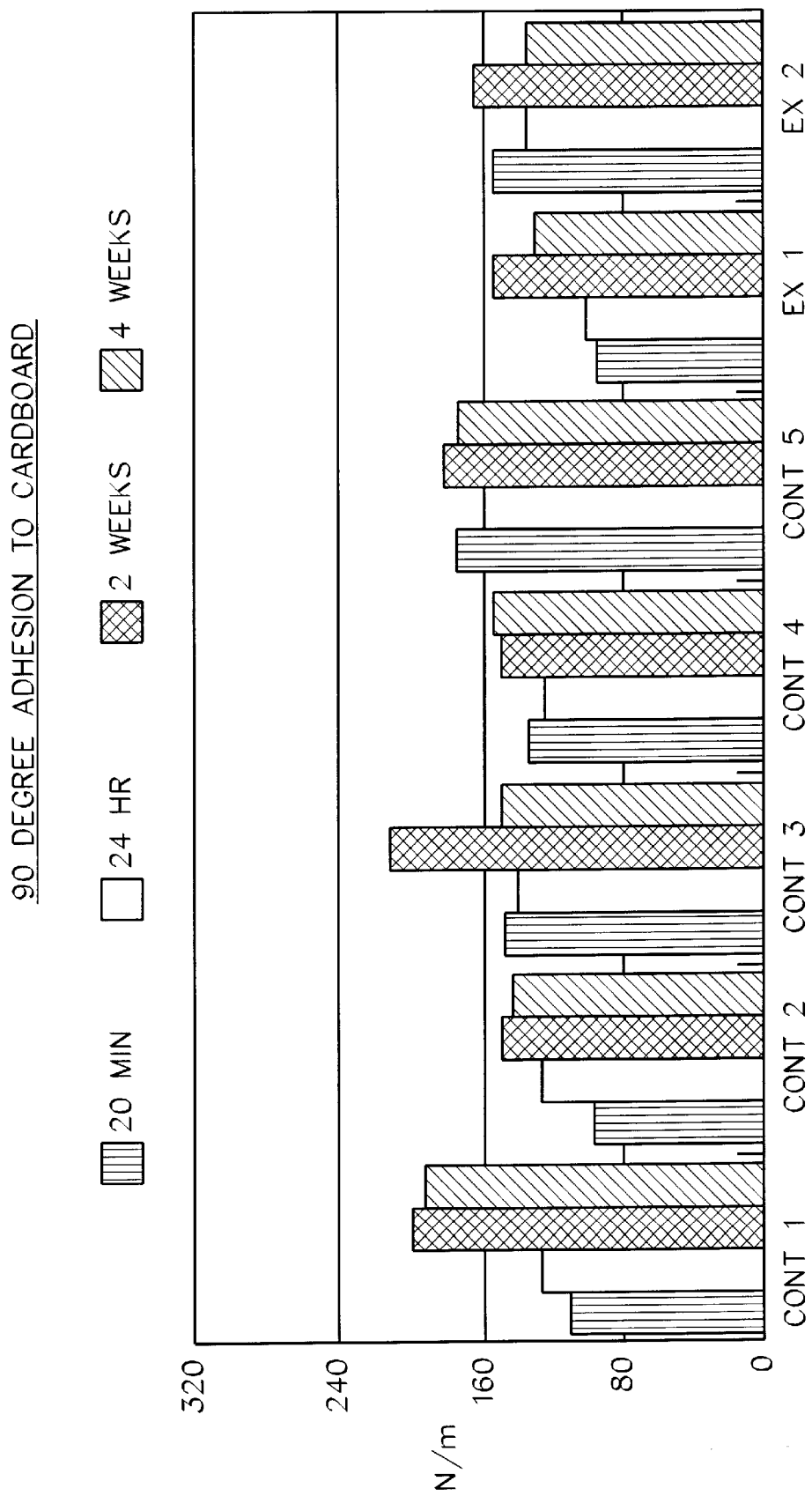
Figure 12:
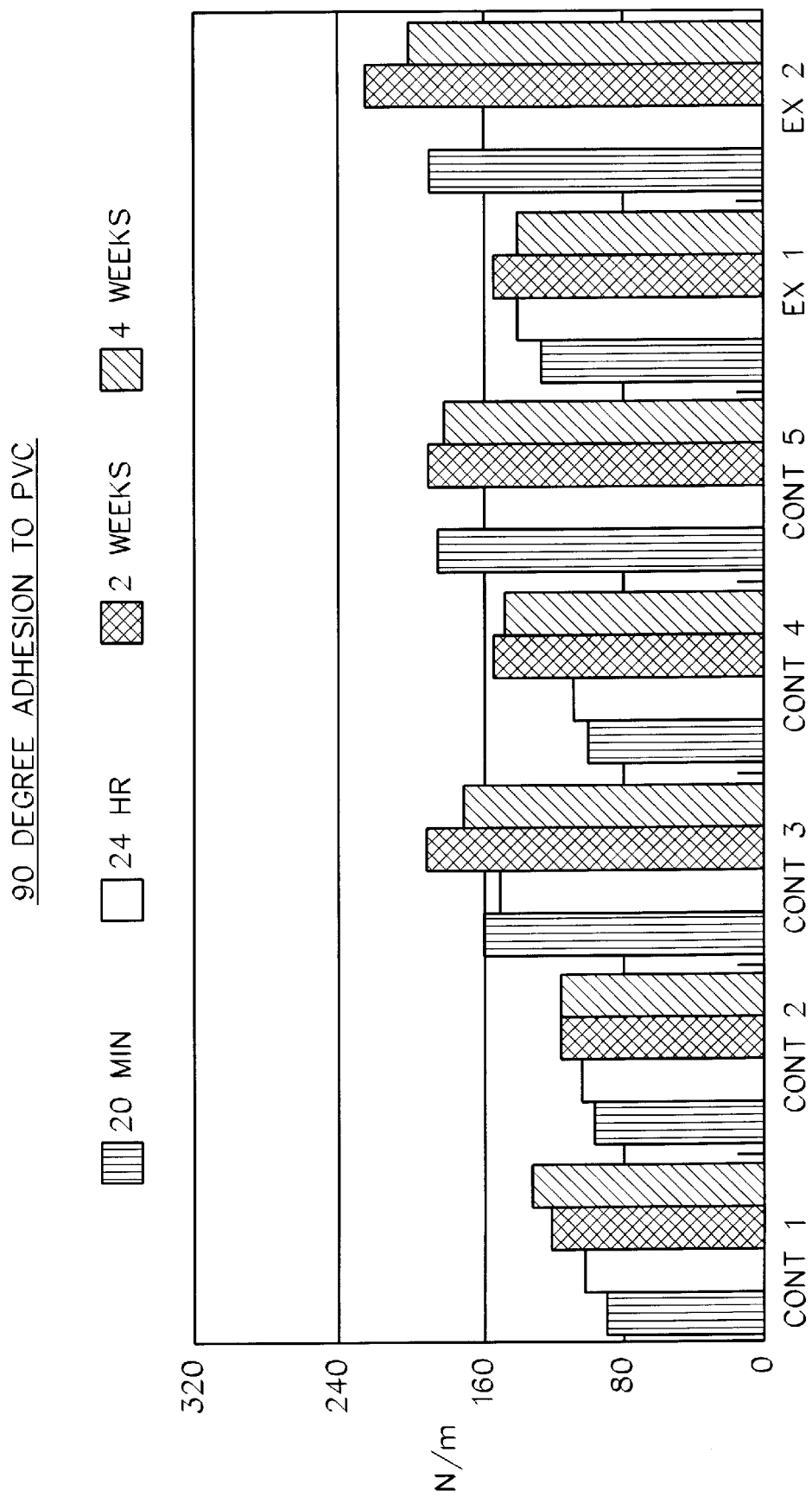

Adhesion performance of the constructions were evaluated for quickstick to various substrates (FIG. 7), 90° adhesion to vellum (FIG. 8), 90° adhesion to glass (FIG. 9), 90° adhesion to high density polyethylene (FIG. 10), 90° adhesion to cardboard (FIG. 11), and 90° adhesion to polyvinyl chloride (PVC) (FIG. 12). Removability was evaluated under natural aging conditions (23° C. at 50% relative humidity with up to one month in various substrates). On vellum and cardboard, FIGS. 9 and 11, three of the constructions, Controls 4 and 6 and Example 2, failed, with adhesive transfer occurring almost immediately after application (20 minutes). This occurred when the R-2 adhesive was coated without using a primer and when there was employed a laminate of R-2 on P-1. On glass, high density polyethylene and polyvinyl chloride adhesive transfer was observed for the unprimed constructions (Cont 4 and 5) after two weeks. The other R-1 constructions gave good removable properties. The best properties were seen for the pre-primed vellum base stock for dual die-coated material prepared using R-1 on a thin (4 gsm) layer of P-1. Results of this study established that it was feasible to prepare a removable adhesive using a dual die-coating system where the primer coat was replaced by a permanent pressure-sensitive adhesive coat which was simultaneously deposited on top of the removable pressure-sensitive adhesive onto a release surface and then transferred to vellum. This is the construction of Examples 1 and 2. It also became clear that the R-2 adhesive gave unacceptable properties when coated without using a primer and, when cast using a dual die with a permanent adhesive gave too aggressive an adhesion, possibly because of some mixing of the permanent adhesive with the removable adhesive when cast with the dual die and possibly due to the permanent adhesive achieving too high an effective thickness. Differences may also be attributable to the fact that the apparatus was different from that used to cast the composition of Example 1. In any event, the study confirmed that it was feasible to use a dual die technique to cast a laminate of a permanent pressure-sensitive adhesive and a removable pressure-sensitive adhesive to get proper bonding to a facestock or backing so as to retain the properties of the removable pressure-sensitive adhesive and its aggressive bond to a backing.

CONTROLS 6, 7, 8 AND 9 AND EXAMPLES 3 AND 4

Figure 13:
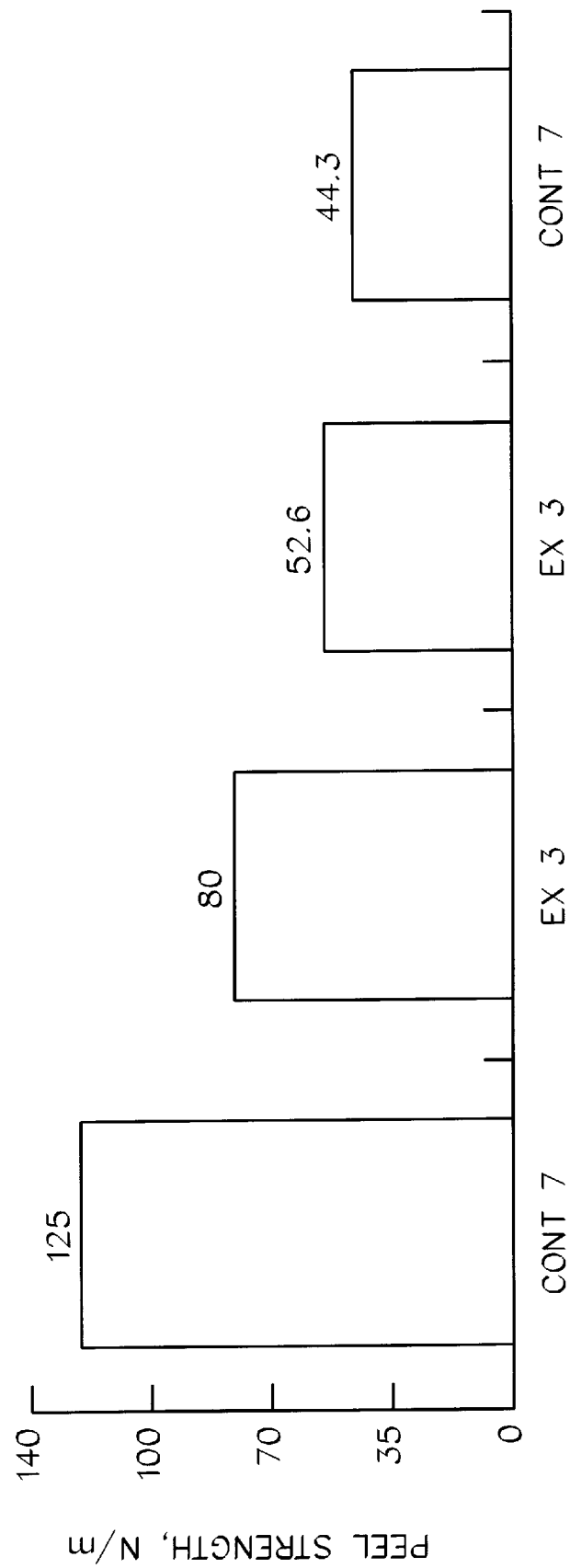
FIGS. 13 and 14 show, respectively, 90° peel and loop tack values to stainless steel as a function of relative coat weight in comparison to a commercial product which is Control 9.
Figure 14:
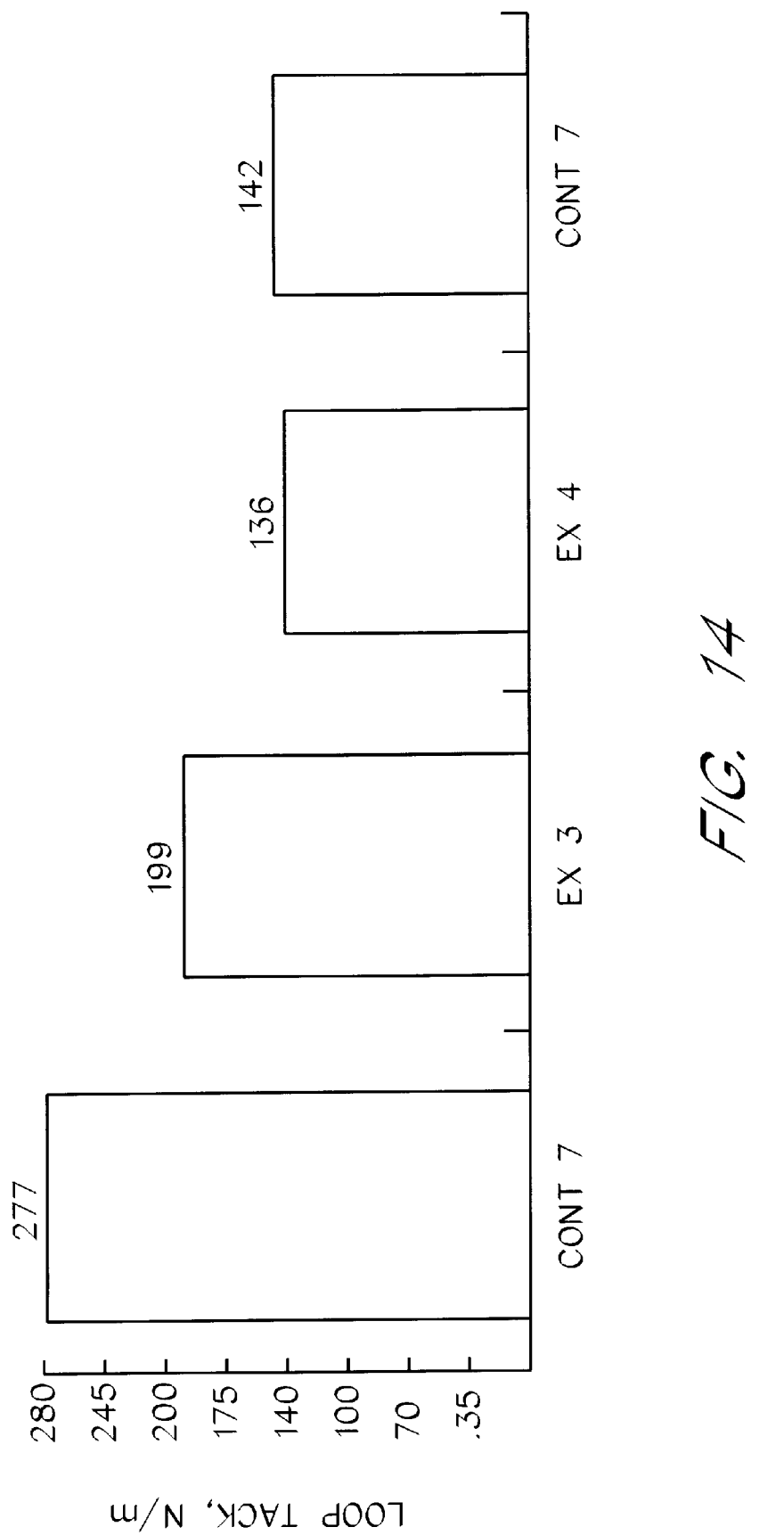

A study was made to show the effect of coat weight ratios of permanent pressure-sensitive adhesive to removable pressure-sensitive adhesive where the total coat weight was about 21 gsm. For purposes of the evaluation, there was used as the release liner a silicone-coated release liner manufactured and sold by Rhinelander. With reference to Table 2, Control 6, for this purpose, was a construction where the only adhesive used was the permanent adhesive P-2. Control 7 was formed using a dual die but at a low coat weight of removable pressure-sensitive adhesive. The coat weight of the permanent pressure-sensitive adhesive to removable pressure-sensitive was 14:7. The thickness of the removable pressure-sensitive adhesive was too low for the product to be a removable but this shows the ability to select adhesion by varying the relative coat weights of removable to permanent pressure-sensitive adhesives. For Control 8 only the permanent pressure-sensitive adhesive was applied to the high-gloss paper. Control 9 was a commercial removable single die coated removable pressure-sensitive adhesive on primed high-gloss paper. Examples 3 and 4 provide the ratio of coatings of adhesive R-3 on permanent P-2 applied to high-gloss paper at relative coat weights of 10.5 to 10.5 gsm, and 17 to 4 gsm. Table 2 shows peel and loop values to stainless steel. Attached FIG. 13 shows in block diagram the relative adhesion of the dual die-coated constructions of Control 7 and Examples 3 and 4 and Control 9; to stainless steel, the test being a 10-minute 90° peel, while FIG. 14 shows loop tack for the same constructions. It is clear that the construction closest to Control 9 was that where the total level of removable was 17 gsm and the permanent 4 gsm, i.e., Example 4. Table 4 compares the 90° peel after 40 days of aging on stainless steel for the composition of Example 4 as compared to Control 9. The same data is also plotted in FIGS. 15 and 16. It is clear that the construction of Example 4 tracks well with the construction of Control 9.

While the invention has been illustrated in terms of a single layer of permanent pressure-sensitive adhesive and a single layer of a removable pressure-sensitive adhesive, it will be appreciated that any given layer may be a composite of several layers of mixtures of emulsion polymers so long as one effective acts as a permanent pressure-sensitive adhesive and the other as a removable pressure-sensitive adhesive.

TABLE 2

10-Minute Peel Test and Loop Tack Tests
Substrate Stainless Steel

| | Construction | | Test Results | |
|---|---|---|---|---|
| Sample # | R-3 (ct. wt.) gsm) | P-2 (ct. wt. gsm) | 10-Min. Peel (N/M) | Loop Tack (N/M) |
| Control 6 | 0 | 23 | — | 497 |
| Control 7 | 7 | 14 | 125 | 278 |
| Example 3 | 10.5 | 10.5 | 79.9 | 198 |
| Example 4 | 17 | 4 | 53 | 0.7798 |
| Control 8 | 21 | 0 | 44 | — |
| Control 9 | commercial removable | | 44 | 142 |

TABLE 4

| | Aging Time (days) | | | | |
|---|---|---|---|---|---|
| Construction | 0 (10 min.) | 1 | 2 | 7 | 40 |
| | Peel Strength (N/M) | | | | |
| Example 4 | 59 | 82 | 97 | 113 | 108 |
| Control 9 | 80 | 114 | 106 | 124 | 140 |

LAY FLATNESS

The present invention may also be applied to form primerless removable adhesive constructions which exhibit significantly improved layflatness than do conventional adhesive constructs in which the facestocks have been treated with an water based primer.

It is well known in the art that conventional removable adhesive constructions, in which the facestock has been treated with an aqueous emulsion as a priming step, show increased deformation of the paper facestock as a result of the priming step. This deformation has a negative impact on the "layflatness" of the paper facestock, and is undesirable as it may interfere with sheet feeding or other post-manufacture uses of the adhesive construction.

Deformation, as manifested by curling of the paper toward or away from the direction of the facestock, is also a consequence of the emulsion priming process and its impact on the adhesive construction. In a conventional treatment process, the facestock is first primed, dried, remoisturized and then laminated to the adhesive layers. The liner surface is release coated, dried and then remoisturized, coated with the adhesive layer, dried an remoisturized a second time, all prior to its being laminated to the facestock. For comparison purposes, in permanent pressure sensitive adhesive constructions, the facestock is directly laminated to the adhesive layers and liners. Thus, for removable pressure sensitive adhesive constructions, the facestock layer undergoes an additional wetting and drying step in comparison to the preparation of permanent pressure sensitive adhesive constructions. These additional wetting and drying steps applied to the facestock alter its hygroexpansivity in relation to the liner, such that differential expansion, and thus curling, may occur after lamination when the PSA construction is allowed to come to an equilibrium moisture content in a particular environment.

As discussed previously, the present invention permits the construction of a removable pressure sensitive adhesive construction without the additional emulsion priming step. Advantageously, the facestock does not therefore undergo an additional wetting/drying cycle, and its hygroexpansivity is in better balance with that of the liner. This results in superior layflatness.

The radius of curvature of the construction may be used to measure curling of the paper. Referring to Table 5, "curl" refers to adhesive construct curling that occurs cross-web, while "hang" refers to adhesive construct curling which occurs down the web. The values provided are radius of curvature in inches, with infinity representing a perfectly flat construct (i.e., no curl). For purposes of comparison, a "curl" indicating a radius of curvature of from infinity to 14 inches or greater is considered acceptable. Also for comparison purposes, a "hang" of from infinity to 11 inches or greater is considered acceptable. It has been noted by the present inventors that primerless removable adhesive constructs of the present invention exhibited curls ranging from 11 to 14 inches while conventional primered removable adhesives exhibited curls of about 8 inches at best. Thus, the primerless removable adhesive constructs show improved layflatness when compared to conventional removable constructs.

TABLE 5

| Property Measured (Acceptable Range) | Radius of Curvature (inches) |
| --- | --- |
| Hang | ∞ to 10.94 |
| Curl | ∞ to 13.81 |

It will be appreciated that certain variations of the present invention may suggest themselves to those skilled in the art. The foregoing detailed description is to be clearly understood as given by way of illustration, the spirit and scope of this invention being limited solely by the appended claims.

What is claimed is:

1. A removable pressure-sensitive adhesive construction, comprising:
   an unprimed facestock;
   a first adhesive layer in contact with the facestock, the first adhesive layer having a first coat weight;
   a second adhesive layer in contact with the first adhesive layer, the second adhesive layer comprising a removable pressure-sensitive adhesive, the second adhesive layer having a second coat weight;
   wherein the ratio of the second coat weight to the first coat weight is between about 1:1 and 4:1; and
   a release surface in contact with the second adhesive layer.

2. The removable pressure-sensitive adhesive construction of claim 1, wherein the first adhesive layer comprises a permanent pressure-sensitive adhesive composition.

3. The removable pressure-sensitive adhesive construction of claim 1, wherein the removable pressure-sensitive adhesive is an acrylic emulsion polymer.

4. The removable pressure-sensitive adhesive construction of claim 3, wherein the acrylic emulsion polymer comprises 75–98% by weight of an alkyl acrylate monomer.

5. The removable pressure-sensitive adhesive construction of claim 4, wherein the alkyl acrylate monomer has from one to about 12 carbon atoms in the alkyl chain.

6. The removable pressure-sensitive adhesive construction of claim 1, wherein the cross-web radius of curvature of the adhesive construction is from about 11 inches to about 14 inches.

7. A removable pressure-sensitive adhesive construction, comprising:
   an unprimed facestock
   a layer of a permanent pressure-sensitive adhesive in contact with the facestock;
   a layer of a removable pressure-sensitive adhesive in contact with the layer of the permanent pressure-sensitive adhesive; and
   a release surface in contact with the layer of the removable pressure-sensitive adhesive, wherein said removable pressure-sensitive adhesive is present at a coat weight of greater than about 50% by weight of the total coat weight.

8. The adhesive construction of claim 7 in which the release surface is provided by a release liner.

9. The adhesive construction of claim 7 in which the coat weight ratio of removable pressure-sensitive adhesive to permanent pressure-sensitive adhesive is at least about 2:1.

10. The adhesive construction of claim 7 in which the coat weight ratio of removable pressure-sensitive adhesive to permanent pressure-sensitive adhesive is at least about 3:1.

11. The adhesive construction of claim 7 in which the coat weight ratio of removable pressure-sensitive adhesive to permanent pressure-sensitive adhesive is at least about 4:1.

12. The adhesive construction of claim 7 in which the permanent pressure-sensitive adhesive and removable pressure-sensitive adhesive layers are formed in part of acrylic pressure-sensitive adhesives.

13. The adhesive construction of claim 7 in which the permanent pressure-sensitive adhesive and removable pressure-sensitive adhesive layers are layers of acrylic pressure-sensitive adhesives which have been co-deposited from aqueous emulsions.

14. A construction as claimed in claim 7 in which the radius of curvature of the construction cross-web is from about 11 inches to about 14 inches.

* * * * *